United States Patent [19]

Chacour

[11] 4,257,574
[45] Mar. 24, 1981

[54] SPHERICAL VALVE SEAL

[75] Inventor: Selim A. Chacour, York, Pa.

[73] Assignee: Allis-Chalmers Corporation, Milwaukee, Wis.

[21] Appl. No.: 26,431

[22] Filed: Apr. 2, 1979

[51] Int. Cl.³ .............................................. F16K 25/00
[52] U.S. Cl. ................................. 251/172; 137/246.22
[58] Field of Search ................... 137/246.22; 251/159, 251/172

[56] References Cited
U.S. PATENT DOCUMENTS

| | | | |
|---|---|---|---|
| 3,013,766 | 12/1961 | Dawson | 251/172 X |
| 3,216,696 | 11/1965 | Cooley | 137/246.22 X |

*Primary Examiner*—Harold W. Weakley
*Attorney, Agent, or Firm*—Robert C. Jones

[57] ABSTRACT

A fixed upstream seal is provided having a variable geometry to provide a maximum body thickness at points of large deflection and a minimum body thickness at points of small deflections with the body thickness varying in progressively from maximum to minimum and minimum to maximum for predetermined halves of the circular seal. Also, a fixed downstream seal is provided having a variable geometry to provide minimum body thickness at points of large axial rotor deflection.

1 Claim, 6 Drawing Figures

SPHERICAL VALVE SEAL

BACKGROUND OF THE INVENTION

Large spherical valves, especially those designed for pumped storage operation, require special design considerations due to their size. A problem with large spherical valves is their inability to completely seal off water flow. For this purpose, the piston seal ring must conform not only to the axial displacement of the stationary rotor seat ring but must also adapt to rapid change of this displacement along the rotor seat ring due to the nonuniform stiffness of the rotor seal support. If the downstream seal is not able to seat, auto-oscillation, a serious and damaging dynamic phenomenon, can occur in the penstock system valve.

In known spherical valves, to accommodate the nonuniform seat ring deflections different approaches have been used. One approach uses flexible metallic seals. Another approach uses rubber seals. Still another approach utilized rubber inserts added to the stationary metal seat ring. However, none of these approaches have proved completely satisfactory.

Accordingly, the present invention involves only metal sealing contacts. The stationary seat ring thickness contour is machined so that a substantially flat sealing surface is presented after the rotor is closed under maximum static head. This insures substantially 100% contact and near uniform contact stress between the piston seal and the seat ring all around the circumference of their contact.

The general object of the present invention is to provide a metallic stationary or fixed rotor seat ring seal which insures substantially uniform engagement by the movable piston ring seal despite large differential deflections of the fixed rotor seat ring seal.

A more specific object of the present invention is to provide a rotor seal ring seal whose seating surface is formed so as to be in a single plane when the rotor is loaded.

DESCRIPTION OF THE INVENTION

Figure 1:
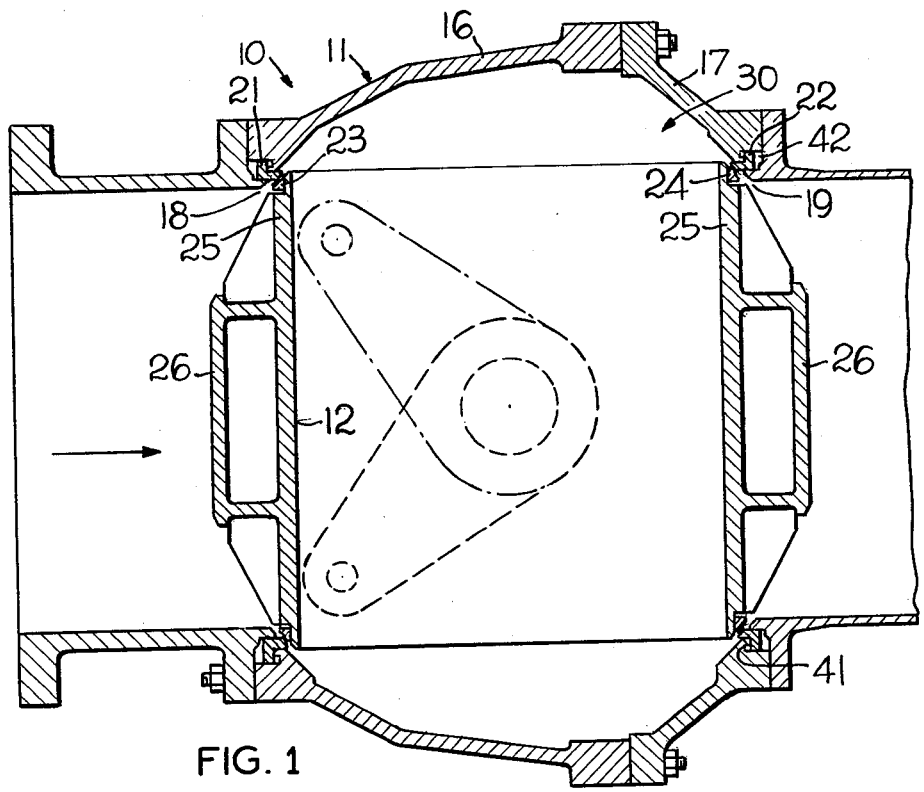
FIG. 1 is a view in vertical section through a rotary spherical valve showing the relationship of the seal elements.

As shown in FIG. 1, a large spherical valve 10 includes a valve body 11 and a valve rotor 12. The valve body 11 may be constructed in any conventional manner and is shown herein as including two sections 16 and 17 secured together in sealed relationship to form a valve chamber 30. The valve body 11 includes an inlet flow passage 18 and an outlet flow passage 19. Annular piston seal elements 21 and 22 are provided about the inlet and outlet openings.

The rotor seal elements 23 and 24 are adapted to be engaged by piston seal elements 21 and 22, respectively. The rotor seal elements 23 and 24 are constructed as annular rings which are secured to a seal support 25 machined in the rotor.

Figure 2:
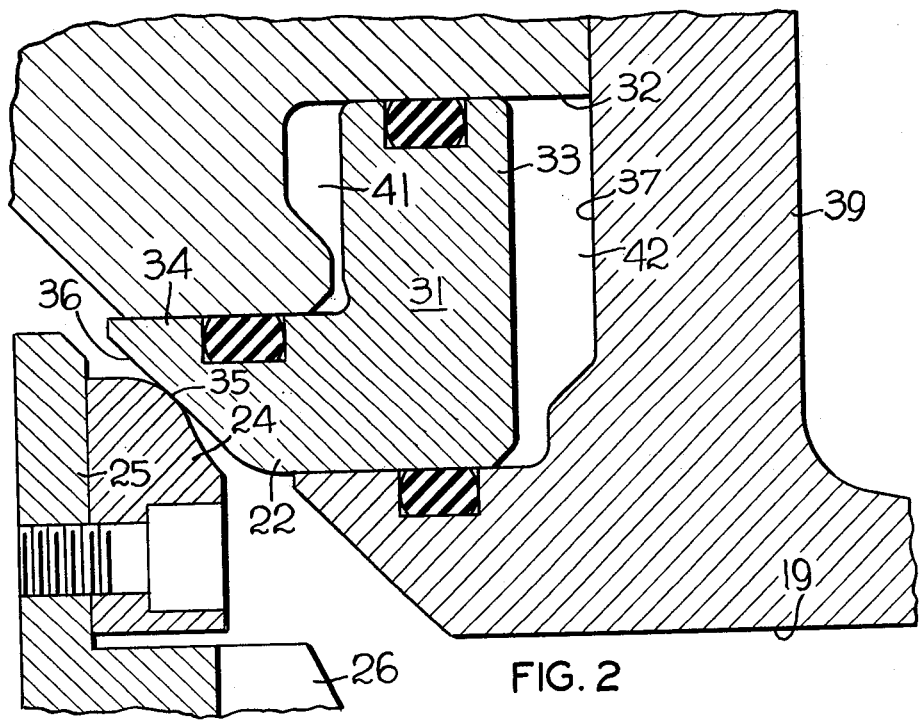
FIG. 2 is an enlarged fragmentary view of the valve of FIG. 1 showing the relationship of the downstream piston seal element and the associated fixed rotor seal element.

The piston seal elements 21 and 22 are similar and the description of the piston seal element 22 will also apply to the piston seal element 21. As shown in FIG. 2, the annular piston seal element 22 has an annular body portion 31 which in cross-section presents an L-shaped configuration. The seal is disposed within a suitable cylinder 32 which surrounds the outlet fluid passageway 19. The long leg 33 of the seal defines the piston while the short leg or arm 34 defines the seal nose portion which is engaged to the stationary rotor seal 24. To this purpose, the inner edge portion of the seal nose portion is beveled as at 36 to provide a compatible surface to cooperate with the very slight arc portion 35 of the fixed seal seat 24.

Effective engagement of the piston seal 34 with the seal seat 24 is accomplished by increasing fluid pressure in chamber 42 formed by the outer cylinder 32 and the inner circumferential surface 37 of a flange portion of the downstream valve body section 39. The arrangement is such that fluid chambers 41 and 42 are formed on each side of the long leg portion 33. Fluid under pressure from a source (not shown) is selectively admitted to the chamber 42, thereby effecting movement of the piston seal 31 into sealing engagement with the rotor seal seat 24 as depicted in FIG. 2. On the other hand, when it is desired to release the piston seal 31 prior to moving the rotor 26 to open position, fluid pressure in the chamber 42 is exhausted and fluid pressure is supplied to chamber 41 to effect a retraction of the piston seal.

Figure 3:
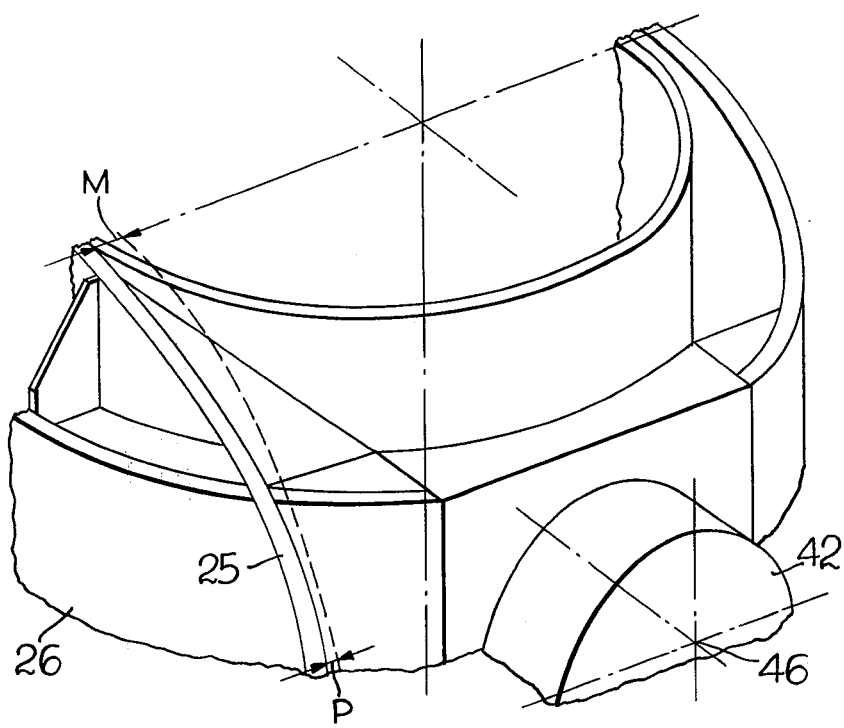
FIG. 3 is a schematic view of one-quarter of the valve rotor.

As previously mentioned, a serious problem with spherical valves, especially the larger sizes of valves, is the insuring of the sealing of the movable piston seal 31 against the stationary seal 24 fixed to the rotor 26 despite large differential deflections of the fixed seal support 25. In the closed position, the rotor 26 deflects under the water pressure load. It has been found that under this type of stress the fixed seal 24 which is fixed to the rotor 26 deflects much more at a point which is 90 degrees from the axis 46 of the rotor trunnion 42 than at the trunnions. This is illustrated in FIG. 3 wherein, because of the symmetry of the rotor components, it is only necessary to show one-fourth of rotor. As illustrated in FIG. 3, the deflection of the seal support 25 at a point which is in a plane that passes through the axis 46 of the trunnion 42 is a minimum amount P. On the other hand, the deflection of the rotor and thus of the seal support 25 at a point which is 90 degrees off the trunnion is a maximum amount M. This relationship exists for all four quarters of the rotor 26. Thus, to insure the sealing of the movable piston ring seal 22 against the fixed seal 24 carried by the rotor 26, it is necessary to provide a metallic fixed seal which will compensate for the large differential deflections of the rotor and the fixed seal.

Figure 4:
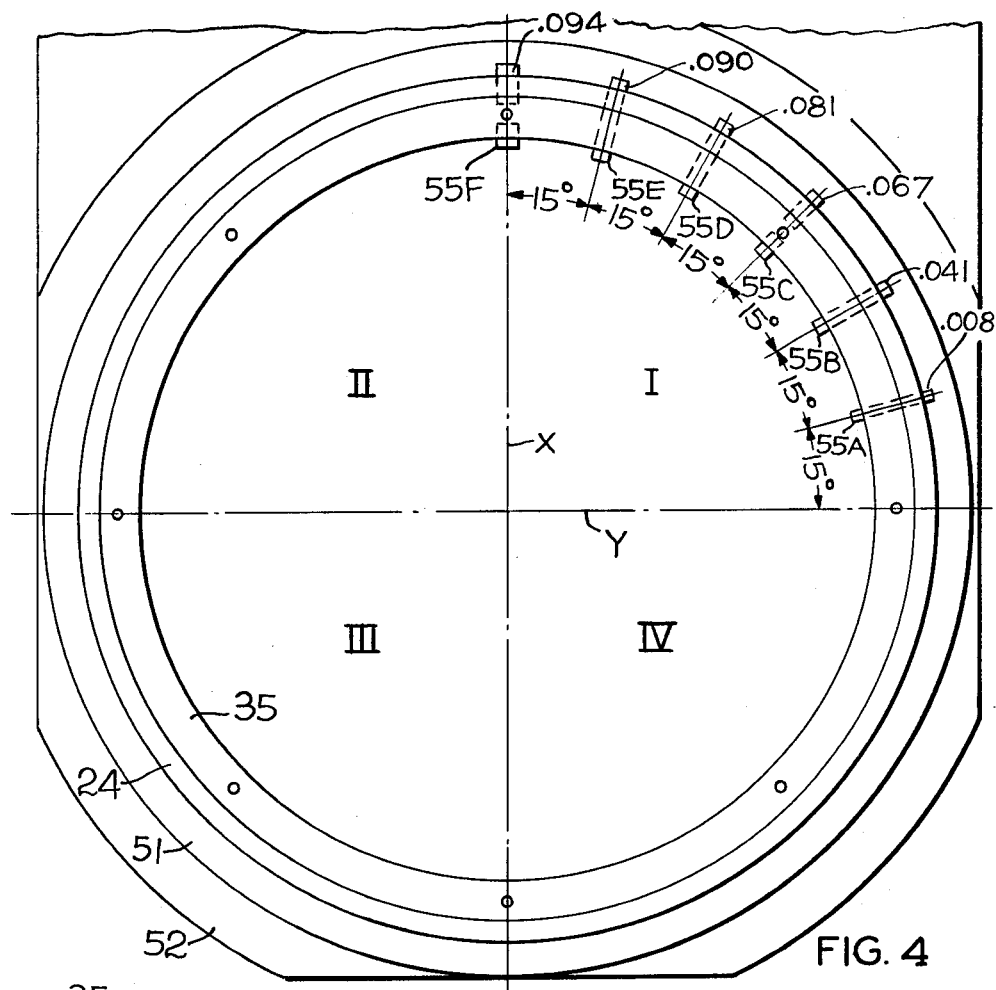
FIG. 4 is a plan view of a rotor seat ring as it is secured to a machine tool table with shims being shown for a one-quarter section of the seat.
Figure 5:
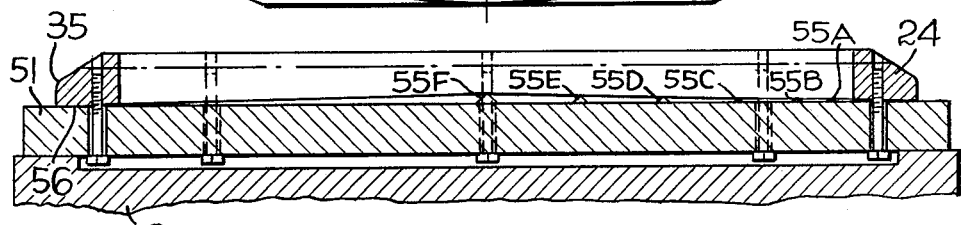
FIG. 5 is a view in vertical section of the seal shown in FIG. 4.
Figure 6:
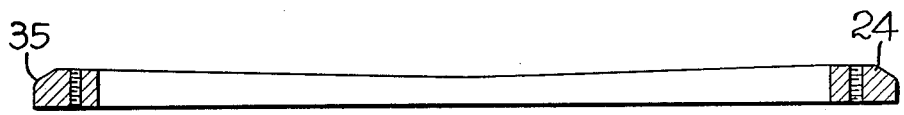
FIG. 6 is a view in vertical section of the seal of FIG. 5 after machining.

To this purpose, it has been determined that a fixed seal 24 could be formed which would accommodate the nonuniform seal ring deflections. To this end, the stationary or fixed seal 24 thickness contour is machined so that a near flat seating surface 35 is presented after the rotor 26 is closed under maximum static head. To form the fixed sealing ring 24 to the desired thickness contour, the sealing ring is secured to a machining table 51 of a machine tool 52 so that a cutting tool (not shown) may be utilized to form the desired contour. The set-up for machining the seating surface 35 of the stationary fixed seal 24 includes the insertion of shims 55 between the machine table 51 and the flat machined surface 56 of the ring 24 opposite to the sealing surface before clamping the ring 24 to the table. The shims 55 must describe the negative contour which it is desired that the fixed ring 24 is to have in order to provide the needed sealing operation. The arrangement is shown in FIGS. 4 and 5. In FIGS. 4 and 5 only a ¼ sector I of the ring 24 is shown shimmed. However, it will be appreciated that the other three quarter sections II, III and IV will be similarly shimmed. In the sector II, the shim thickness will decrease with the shim 55F being common to both of the sectors I and II. At the axis y at the point common to sectors II and III there is no shim. Continuing in a counterclockwise direction, as viewed in FIG. 4, from the y axis, the shim thickness increases to a maximum shim, similar to shim 55F, which will be common to sectors III and IV. Through sector IV the shim thickness decreases to the point on the y axis where there is no shim. While each of the sectors I, II, III and IV have been described as having six shims spaced angularly equal distance apart, it will be appreciated that the number of shims must be close enough together to insure that the seal ring will not distort under tool pressure.

With the step-up described, the seal ring 24 will be machined so as to present the contour necessary to effect positive sealing of the valve.

The method of determining the required shim thicknesses is set as follows: Obtain 3-dimensional finite element axial deflections of the rotor closed and seals engaged under maximum static head; tabulate the deflections of the seal support 25 at respective angular locations and calculate shim thickness.

The embodiments of the invention in which an exclusive property or privilege is claimed are defined as follows:

1. In a spherical valve having a valve body presenting a fluid inlet and outlet;
  a valve rotor having an axis of rotation and provided with a fluid passageway supported within said valve body for positioning between an open position wherein the passageway therein is aligned with the valve body inlet and outlet and a closed position wherein the passageway is rotated so that fluid flow through the valve is blocked;
  a movable piston ring seal carried by said valve body and surrounding said inlet and/or outlet openings;
  a fixed seat ring seal secured to said rotor in position around the ends of the passageway therein that is associated with the inlet and/or outlet openings of the valve body and operable in cooperation with said movable piston ring seal to effect a fluid seal, said rotor seat ring seal being formed so as to present a minimum thickness contour at points 180° apart from each other and in a plane which passes through the axis of rotation of the rotor and having a maximum thickness contour at points 180° apart from each other and which are 90° from the plane which passes through the axis of rotation of the rotor so as to be operable to compensate for the differential deflections of the rotor and the seat ring seal when said rotor is under maximum static load.

* * * * *